United States Patent
Naud

[19]

[11] Patent Number: 6,123,124
[45] Date of Patent: Sep. 26, 2000

[54] TREE FELLING HEAD

[76] Inventor: Jean-Yves Naud, 1130 Grant Mont, St-Felicien, Quebec, Canada, G8K 2W9

[21] Appl. No.: 09/350,464

[22] Filed: Jul. 9, 1999

[30] Foreign Application Priority Data

| Jul. 9, 1998 | [CA] | Canada | 2242538 |
| Jul. 9, 1998 | [CA] | Canada | 2242625 |

[51] Int. Cl.$^7$ .............................................. A01G 23/08
[52] U.S. Cl. ...................... 144/4.1; 144/34.1; 144/336; 144/335
[58] Field of Search ................ 144/4.1, 24.13, 144/34.1, 34.5, 335, 336, 338

[56] References Cited

U.S. PATENT DOCUMENTS

| 4,552,191 | 11/1985 | Kuusilinna | 144/4.1 |
| 4,989,652 | 2/1991 | Hansson | 144/336 |
| 5,101,872 | 4/1992 | Scheuren | 144/336 |
| 5,579,816 | 12/1996 | Hill et al. | 144/34.1 |
| 5,595,225 | 1/1997 | Gilbert et al. | 144/34.1 |
| 5,727,610 | 3/1998 | Isley | 144/338 |
| 5,908,060 | 6/1999 | Fargeot | 144/4.1 |
| 5,975,166 | 11/1999 | MacLennan | 144/34.1 |

OTHER PUBLICATIONS

Brochure for Gilbert–Tech Inc. for Gilbert 1249 (at least as early as Jul. 8, 1998).
Brochure for Gilbert–Tech Inc. for Gilbert 1245 (May 1996).
Brochure for Gilbert–Tech Inc. for Gilbert 1252 (at least as early as Jul. 8, 1998).
Denharco Specifications Manual for CS5500RTA 240–Degree Side Tilt Felling Head (May 1997).

*Primary Examiner*—W. Donald Bray
*Attorney, Agent, or Firm*—Ratner & Prestia

[57] ABSTRACT

Described herein is a tree felling head for restraining, cutting and manipulating trees. The felling head comprises a holder connected to the manipulator arm of a tree cutting carrier, a motor at least partially housed in either the frame of the felling head or the holder, and a bearing-like member or transmission connecting the motor to the frame of the felling head. The frame further comprises arms for gripping trees and a saw for cutting same. The felling head preferably comprises a gear assembly for augmenting the torque produced by the motor. The gear assembly is preferably a planetary gear train and is at least partially housed in either the frame or the holder of the felling head.

28 Claims, 6 Drawing Sheets

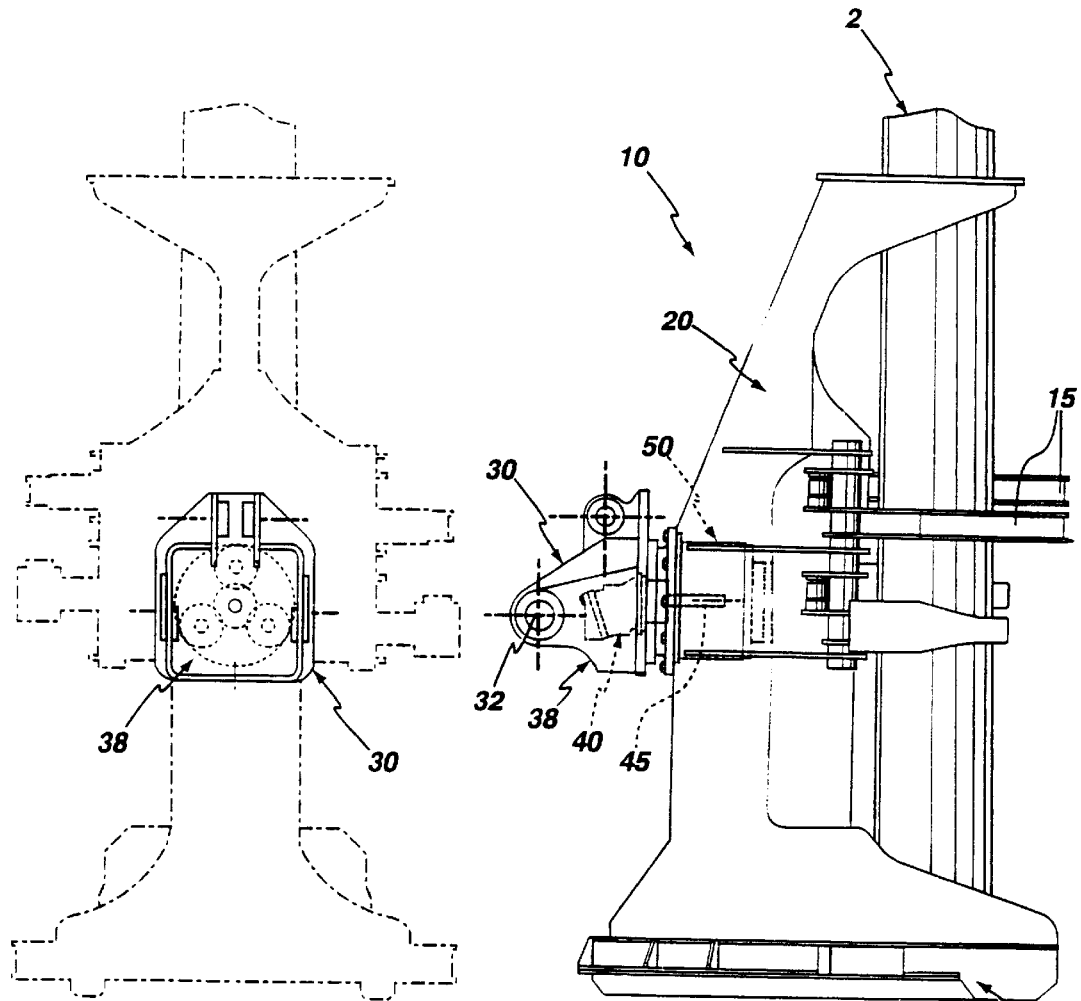
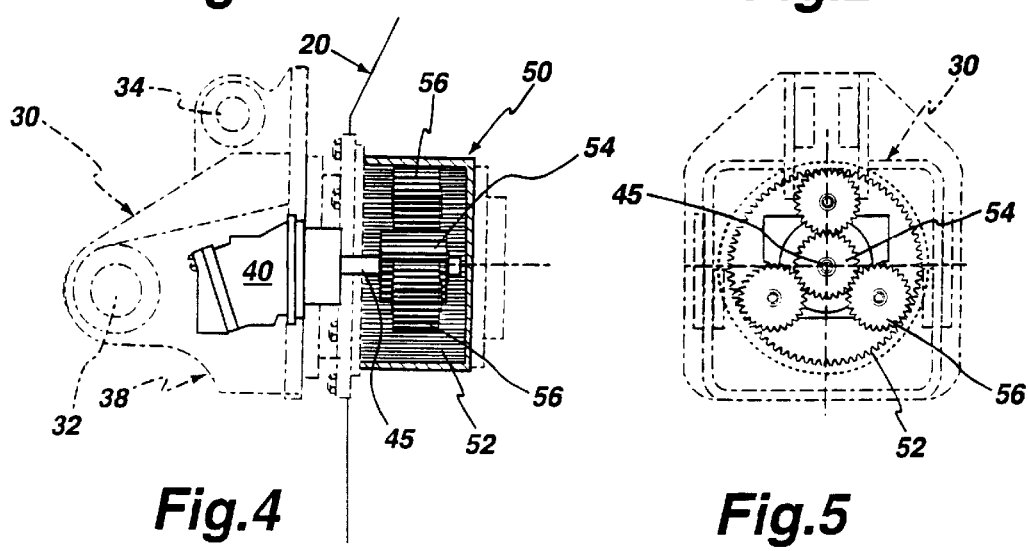

TREE FELLING HEAD

FIELD OF THE INVENTION

The present invention relates to logging machinery and, more particularly, to an improved felling head for gripping, cutting and manipulating trees.

BACKGROUND OF THE INVENTION

For many years now, felling heads have replaced the traditional chainsaw in most logging operations where trees are of medium diameter. The felling head is usually used to restrain, cut, accumulate and pile trees in a single, quick operation. The felling head is normally mounted on the end of a hydraulic crane or manipulator, which is, in turn, mounted to a tractor or tracked vehicle. The felling head is a much more efficient device than the traditional hand-carried chainsaw and, surprisingly, it causes less damage to the environment because felled trees are not dragged on the forest floor, crushing and uprooting young stems, saplings and undergrowth.

Some felling heads are especially well-suited for manipulating trees mainly because they can be tilted back and forth as well as sideways. In this specification, the expression "tilted back and forth" refers to the pitch of the frame as illustrated in FIG. 1. Similarly, the expressions "tilted sideways" or "side tilt" should be construed to refer to the roll of the frame about an axis of rotation transverse to the frame as illustrated in FIG. 6.

The back and forth tilting motion is achieved by a hydraulic actuator normally installed on the manipulator arm (or crane). The double attachment of the felling head to the manipulator arm allows the felling head to pivot about one of the attachment points while the hydraulic actuator pushes or pulls on the other attachment point. This back and forth tilt (or pitch) makes it possible for the felling head to position itself parallel to the tree and, after the cut, to lay the tree on the ground.

In addition to the back and forth pitch, the sideways tilting motion (i.e. the roll) gives the felling head greater maneuverability in gripping, cutting and manipulating trees and thus increases the potential for producing larger piles of trees in a given period of time without having to constantly readjust the position of the tractor. Thus, a highly maneuverable felling head increases the efficiency of the logging operation. Furthermore, since the felled trees can be easily manipulated and piled in a convenient location for the transporter to pick them up, the harvesting minimizes the damage to neighboring trees and saplings.

Although the present description deals primarily with the gripping, cutting and manipulating of trees, it should be appreciated by a man skilled in the art that the felling head of the present invention could also be used to grip, cut and manipulate wooden poles (e.g. telephone poles or power-line poles) or, with a different type of saw blade practically any tree-like or pole-like object.

In the prior art, many different types of mechanisms have been used to create the side tilting motion of the felling head. Some prior art systems use a pair of hydraulic actuators mounted on the felling head that are linked to a large gear, itself linked to a central gear around which the tilting motion is achieved. The hydraulic actuators push and pull simultaneously on the large gear, thereby rotating the felling head around the central gear. In this case, the rotation is limited by the travel of the hydraulic actuators to a side tilt rotation of about 180 degrees.

Other systems use a hydraulic motor and chain arrangement. A hydraulic motor with a drive shaft and sprocket is mounted on the felling head and linked with a chain to a large central sprocket located at the rotational axis of the felling head. When the motor sprocket turns, it induces a side tilting motion to the felling head. This arrangement has a much larger rotational range than the hydraulic actuator arrangement described in the previous paragraph. Its range can reach 360 degrees.

Other combinations of actuators, gear assembly, sprockets and chains are commonly found in the prior art but they all share the same feature in that the components necessary for the side-tilt rotation are housed directly on the felling head itself and in a position that is not coaxial with the side-tilting axis of rotation of the frame of the felling head. This contributes extra weight and inertia to the felling head which, in turn, reduces the maneuverability of the felling head. Not only are such cumbersome felling heads slower to rotate but the energy expenditure during operation is higher. Moreover, since the motor is located on the frame, the hydraulic lines have to be routed from the holder to the frame. When operating amid thick branches, these hydraulic lines may become snagged.

These prior art arrangements tend to be bulky, heavy and generally involve moving parts that are often exposed to the rigorous environment of the logging field. Exposed components such as gears, chains, sprockets or hydraulic actuators, are susceptible to being hit and damaged. Open moving parts are prone to becoming tangled in branches. Furthermore, dust and dirt tend to clog lubricated moving components and thus these arrangements require regular maintenance to avoid breakdowns.

Thus, there is a need in the logging industry for an improved felling head.

OBJECTS AND STATEMENT OF THE INVENTION

It is therefore an object of the present invention to provide a felling head that is light and compact and thus more maneuverable.

It is another object of the present invention to provide a felling head in which the actuating element is coaxial with the axis of rotation of the felling head.

It is another object of the present invention to provide a felling head that is mechanically reliable and requires very little maintenance.

It is another object of the present invention to provide a felling head that has few moving or exposed parts.

It is another object of the present invention to provide a felling head that is less susceptible to damage.

It is another object of the present invention to provide a felling head that has few components and is thus easy and inexpensive to manufacture.

As embodied and broadly described herein, the present invention provides a felling head for mounting to a suitable tree cutting carrier's manipulator arm for restraining, cutting and manipulating trees. The felling head comprises a frame, a holder for connecting the frame to the manipulator arm. A bearing-like member rotatably connects the frame to the holder and defines a rotational axis about which the frame may rotate. A motor having a drive shaft rotatable about the rotational axis is provided and is coupled to the bearing-like member, whereby, in operation, the motor is adapted to impart rotational motion to the frame. Such a coaxial arrangement simplifies the transmission of torque from the motor to the frame. By minimizing the size and complexity of the transmission, the manufacturing cost and overall weight of the felling head is reduced. Furthermore, by minimizing the number of moving parts associated with a transmission system, the reliability of the overall felling head is improved and maintenance requirements become less demanding.

Advantageously, the felling head further comprises a gear assembly. A gear assembly augments the torque produced by the motor so that a large torque is exerted on the frame, thus permitting the manipulation of loads having high inertia.

Advantageously, the motor is mounted to the holder. Without the additional weight of the motor, the frame is lighter. Since the frame is lighter, the frame is more maneuverable and can achieve higher angular accelerations for a given motor torque rating. Moreover, since the frame is lighter, not only is the frame more maneuverable but the amount of energy dissipated during operation is less than the energy dissipated had the motor been located on the frame. Furthermore, the presence of the motor on the holder simplifies the hydraulic routing to the motor which thus leaves the frame unencumbered by hydraulic lines. When operating amid thick branches, a felling head without hydraulic lines running from the manipulator arm to the frame is less likely to become ensnared or tangled.

Advantageously, the motor has a drive shaft defining the rotational axis about which the frame is rotatably mounted. Such a felling head would be more compact and thus more easily operated in tight spaces. Furthermore, having the motor coaxial with the axis of rotation of the frame simplifies the transmission of torque from the motor to the frame. In other words, all that is required to transmit torque from the drive shaft of the motor to the frame is a gear assembly. The simplicity of this axial configuration of the motor not only simplifies design and assembly, but it also reduces the number of parts required to implement the design and thus reduces the cost of each felling head.

Advantageously, the holder defines a cavity in which the motor is at least partially housed, the drive shaft protruding from the cavity. Thus, the holder at least partially protects the motor from collisions with trees, branches, dirt and other deleterious elements of the environment. The frame also defines a cavity in which the gear assembly is at least partially housed, the gear assembly being adapted to cooperate with the drive shaft. Thus, the frame at least partially protects the gear assembly from collisions with trees, branches, dirt and other deleterious elements of the environment.

Advantageously, the gear assembly comprises a planetary gear train. The use of a planetary gear train ensures that a very large gear ratio is obtained between the drive shaft of the motor and the frame. In other words, a planetary gear train can greatly augment the torque produced by the drive shaft of the motor. While the torque necessary to rotate the frame is large, the torque required to rotate the frame when gripping a multitude of tall trees can become enormous. Thus, a planetary gear train is preferable to increase the torque output by the drive shaft of the motor to a level sufficient to rotate and manipulate both the frame and the frame's load of trees.

Furthermore, the motor may be radially spaced apart from the axis of rotation defined by the bearing-like member. In this configuration, the motor is mounted to the holder but the drive shaft of the motor is not coaxial with the axis of rotation of the frame. The motor is linked to the frame via a transmission involving either a pulling belt, a chain and sprocket, or a rack and pinion or a gear assembly. In this configuration, with the gear assembly not mounted to the frame, the frame would also be lighter and more maneuverable.

Other objects and features of the invention will become apparent by reference to the following description and drawings.

BRIEF DESCRIPTION OF THE DRAWINGS

A detailed description of the preferred embodiments of the present invention is provided hereinbelow, by way of example only, with reference to the accompanying drawings, in which:

FIG. 2 is a side elevational view of a first embodiment of a felling head in accordance with the present invention;

FIG. 3 is a rear elevational view of the felling head of FIG. 2 showing the details of the holder;

FIG. 4 is a side elevational view of the motor and gear assembly arrangement of the felling head of FIG. 2;

FIG. 5 is a rear elevational view of the planetary-type gear assembly of the felling head of FIG. 2;

Figure 1:
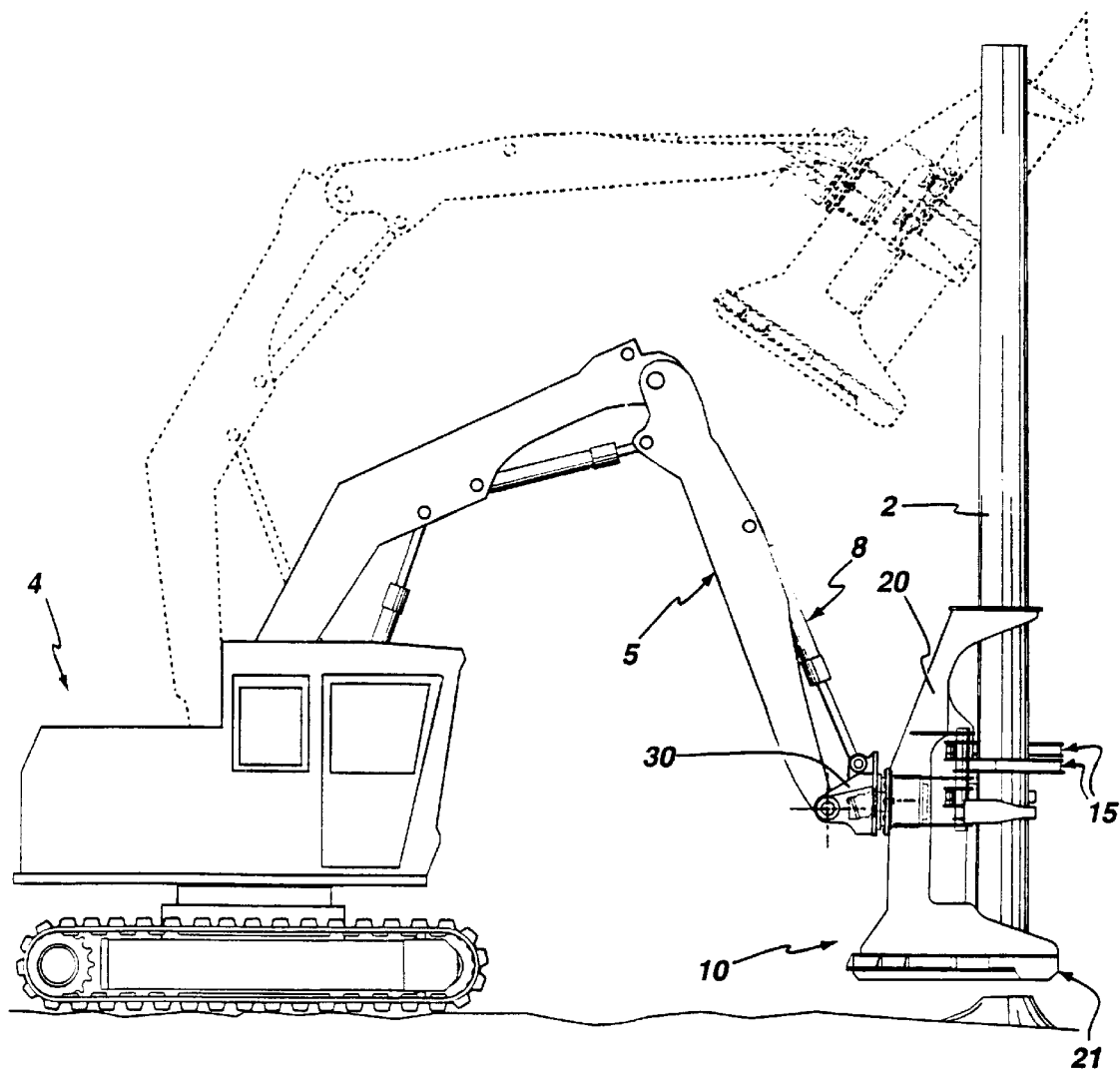
FIG. 1 is a side elevational view of a felling head mounted on a typical tree cutting carrier's manipulator arm in a logging environment.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF THE PREFERRED EMBODIMENT

FIGS. 1 and 2 illustrate a first embodiment of a felling head according to the present invention designated comprehensively by the reference numeral 10. The felling head 10 is mounted to a tilting holder 30 which in turn is normally attached to a manipulator arm 5 of a tree cutting carrier 4 or other such vehicle. Felling head 10 is made of a frame 20 on which is typically mounted a plurality of restraining arms 15 used to restrain trees as the saw blade located normally at base 21 of frame 20 cuts the bottom part of the tree trunk. Frame 20 is provided with a transmission arrangement, for example a gear assembly 50. In the illustrated example, gear assembly 50 is of planetary type. The planetary gear train 50 is solidly affixed to tilting holder 30 and to frame 20. Tilting holder 30 has a cavity in which a hydraulic motor 40 is at least partially housed. Motor 40 is coupled to gear assembly 50 via a drive shaft 45 which transfers the rotary motion of motor 40 to gear assembly 50. Since frame 20 is fixed to the outer shell of gear assembly 50, frame 20 therefore follows the rotation of gear assembly 50. Frame 20 rotates about the axis defined by drive shaft 45. For the purposes of this specification, this arrangement is termed "coaxial" since the axis of rotation of drive shaft 45 is in alignment with the axis of rotation of frame 20. Furthermore, this arrangement permits frame 20 to rotate at least 360 degrees with respect to holder 30. Thus, felling head 10 can be maneuvered into practically any posture for gripping, cutting and manipulating trees.

In normal use, tree cutting carrier 4 is positioned near a tree 2. The manipulator arm 5 is extended and frame 20 of felling head 10 is positioned preferably parallel to the tree trunk. Depending on the position of the tree cutting carrier 4 relative to the tree 2, felling head 10 may need to be tilted backward or forward and/or sideways.

To control the backward and forward motion of felling head 10, the operator actuates hydraulic actuator 8. The holder 30 is linked to manipulator arm 5 at pivoting point 32 and to hydraulic actuator 8 at pivot point 34 of holder 30. As the hydraulic actuator 8 pulls or pushes at pivot point 34, holder 30 and therefore felling head 10 rotate about pivoting point 32. If the operator needs to tilt felling head 10 sideways, he actuates hydraulic motor 40. Drive shaft 45 of motor 40 imparts rotary motion to gear assembly 50 and therefore to felling head 10.

When felling head 10 is properly aligned with the tree 2, restraining arms 15 open and grasp the tree. In that same motion, the saw located at base 21 of frame 20 cuts the tree 2. With the tree cut and firmly held by restraining arms 15 of felling head 10, manipulator arm 5 lifts the tree 2 and motor 40 rotates frame 20 so that the length of the tree is generally parallel to the ground and then, finally, manipulator arm 5 lays the tree 2 on the ground in a position that will be easily accessible for the collection vehicle to pick up and carry away. To facilitate the pick-up procedure, it is preferable to make neat piles of trees, having every trees parallel to each other. This is why the sideways rotation, or roll, of felling head 10 is advantageous. Because felling head 10 is able to tilt sideways, the operator is able to place every tree parallel to each other even if he has moved tree cutting carrier 4 to a new location.

Figure 12:
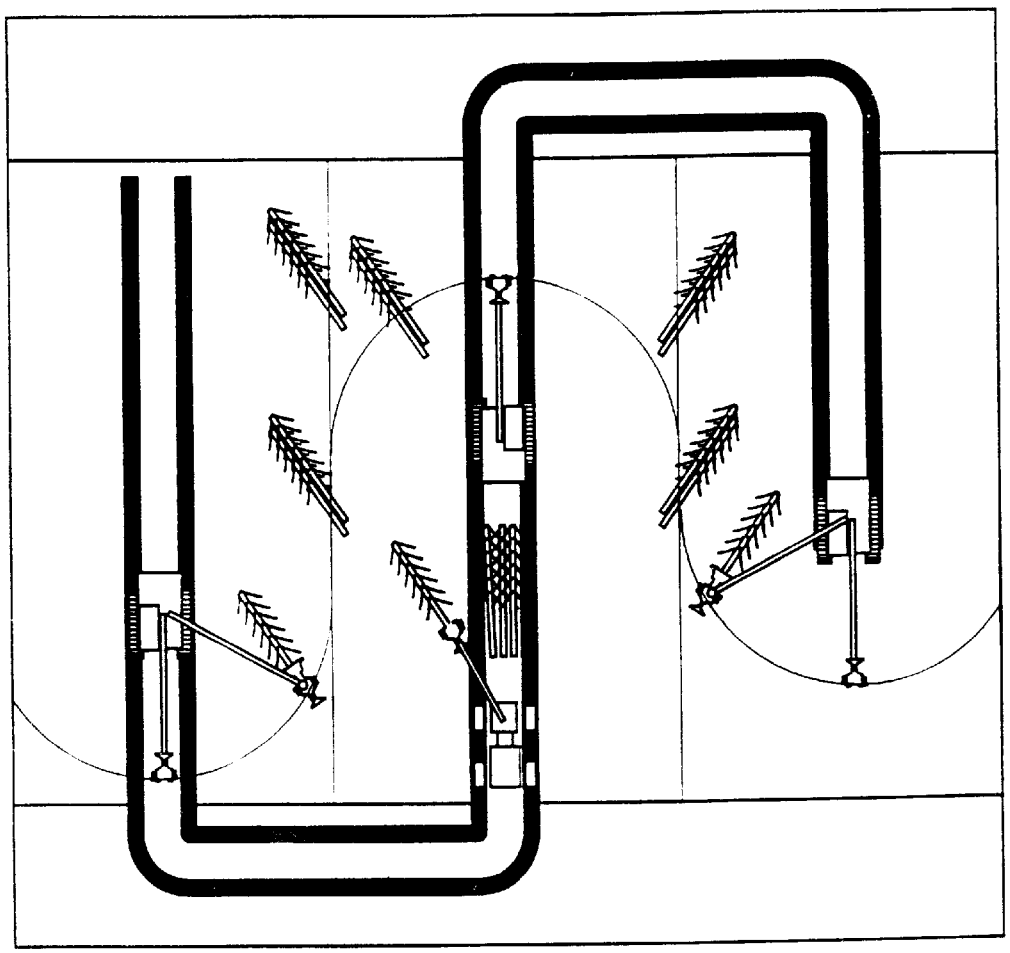
FIG. 12 is a top plan view of a path that a tree cutting carrier could follow to produce an efficient and environmentally-conscious tree-piling pattern.

FIG. 12 shows a path that the operator could follow in the logging area. By positioning the felled trees in piles that are within range of the middle path, the heavier machines used to pick up the trees only have to use the middle path. This has the advantage of being less damaging to the small trees and undergrowth as well as being faster and more efficient.

FIGS. 3,4 and 5 show that hydraulic motor 40 is enclosed and mounted in a cavity 38 of holder 30 where it is protected from tree branches and tree trunks that could damage hydraulic motor 40 or its hydraulic hoses. Gear assembly 50 is at least partially housed in frame 10 and also protected from damage. The outer shell of gear assembly 50 is bolted to frame 20 while the inner part of gear assembly 50 is attached to holder 30. This arrangement creates a lighter frame than what is commonly found in the prior art. The weight of felling head 10 is an important feature considering that, when the manipulator arm 5 is fully extended, the weight of the felling head 10 applies an enormous force to the entire structure of the tree cutting carrier 4. This arrangement is also very compact and allows the operator to manipulate felling head 10 in dense wooded areas without it getting tangled in branches.

Figure 6:
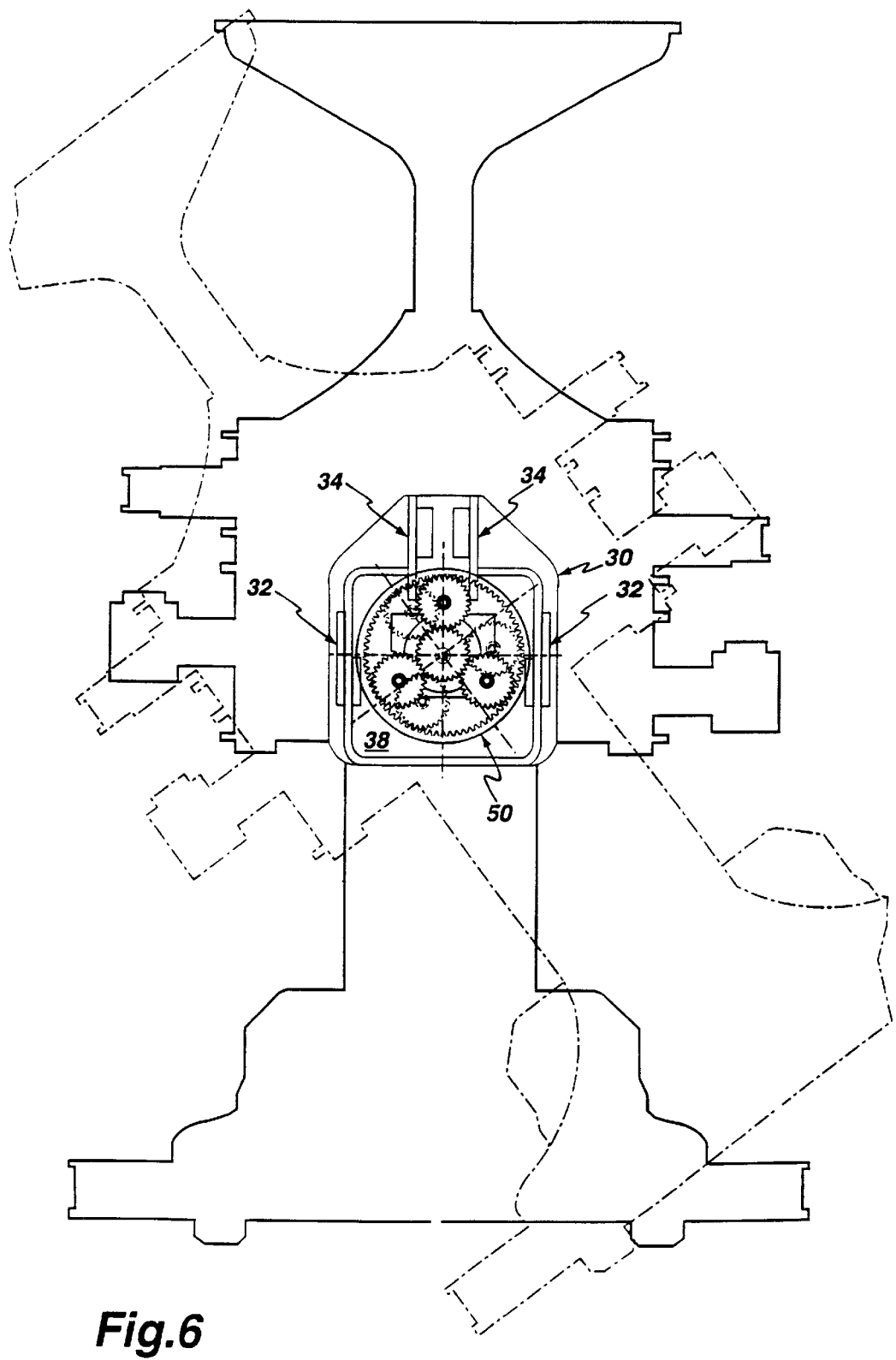
FIG. 6 is a rear elevational view of the felling head of FIG. 2, rotated about the axis of rotation of the drive shaft.

FIG. 6 shows felling head 10 in dotted lines rotated sideways about the axis defined by drive shaft 45 of motor 40 and the central gear 54 (shown in FIG. 5) of gear assembly 50. Since the inner workings of a planetary gear train are understood by those skilled in the art, suffice it to say that the torque of central gear 54 is transferred to intermediate gears 56 which in turn transfers it to the final gear 52 on which frame 20 is rigidly attached. Frame 20 rotates about the axis of rotation of drive shaft 45 by following final gear 52. With this arrangement, felling head 10 is capable of at least 360 degrees of rotation.

Figure 7:
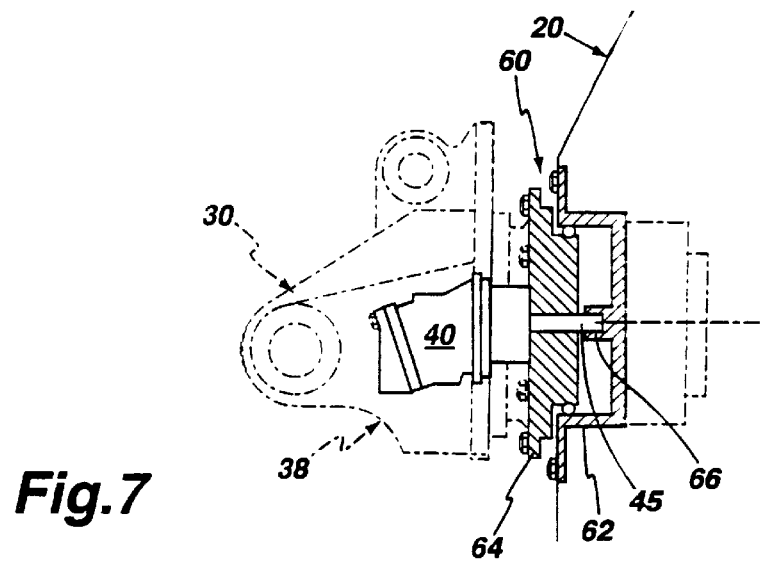
FIG. 7 is a side elevational view of a variant of the felling head of FIG. 2, showing a motor linked to the frame via a bearing-like member.

FIG. 7 illustrates a variant of the first embodiment of the present invention in which the torque produced by motor 40 is transmitted to frame 20 via an intermediate element, for instance, a bearing-like member 60. This bearing-like member 60 may be a roller bearing, a ball bearing, a journal bearing or simply a low-friction shaft-sleeve arrangement. In this particular variant, Drive shaft 45 is connected to bearing-like member 60. Drive shaft 45 of motor 40 and a central inner gear 66 are coaxial. In other words, the drive shaft 45 and central inner gear 66 share the same axis of rotation. The inner part 64 of bearing-like member 60 is affixed to holder 30 while outer part 62 is affixed to the frame 20. Drive shaft 45 extends through an aperture in inner part 64 and is linked to outer part 62 at central inner gear 66. The torque of motor 40 is transferred to frame 20 by drive shaft 45 and outer part 62 of bearing-like member 60, thereby rotating the frame.

Figure 8:
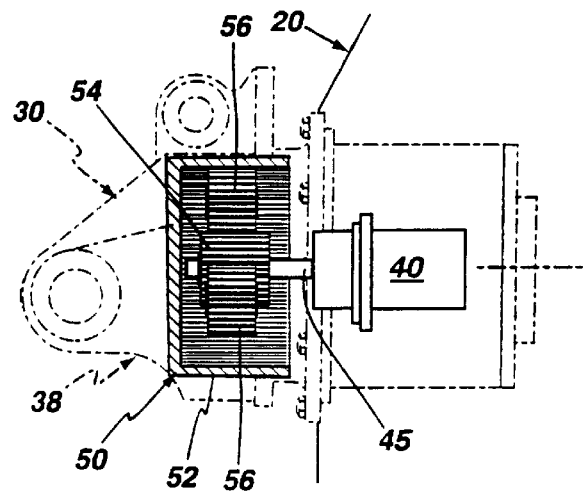
FIG. 8 is a side elevational view of a second embodiment of the present invention, illustrating a felling head wherein the motor is located on the frame and the gear assembly is located on the holder.

FIG. 8 shows a second embodiment having a drive shaft 45 that is coaxial with the axis of rotation of the frame 20. In this embodiment, motor 40 is housed in frame 20 and is also aligned with the axis of sideways rotation of frame 20. The gear assembly 50 is housed in the cavity 38 of holder 30. Motor 40 imparts rotational motion to drive shaft 45 which in turn imparts rotational motion to central gear 54. Since the final gear 52 of gear assembly 50 is held rigidly onto holder 30, the rotational movement is transferred back to the motor 40, thereby rotating the frame 20. This arrangement simply reverses the transfer of torque but is as strong and sturdy as the first embodiment depicted in FIGS. 1–7.

Figure 9:
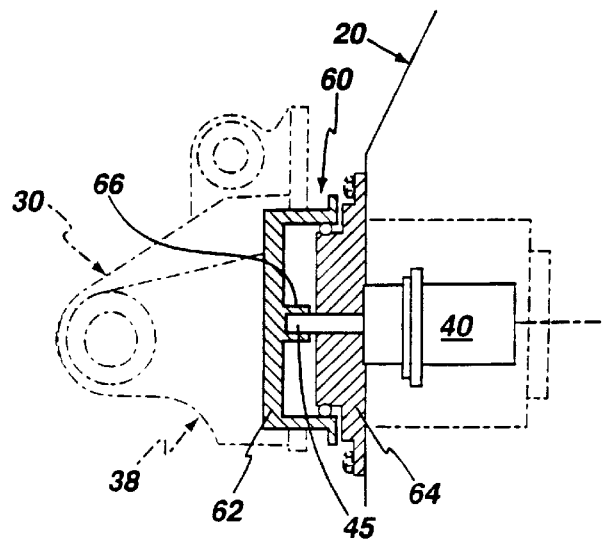
FIG. 9 is a side elevational view of a variant of the second embodiment of FIG. 8 wherein a bearing-like member is located on the holder.

FIG. 9 illustrates a variant of the second embodiment depicted in FIG. 8. motor 40 is housed in the frame 20 and is also aligned along the axis of rotation of frame 20. Rotational motion of frame 20 is achieved through bearing-like member 60 which is housed in cavity 38 of the holder 30. Drive shaft 45 of motor 40 extends through an aperture in inner part 64 and is linked to outer part 62 at central inner gear 66. Motor 40 imparts rotational motion to drive shaft 45, which in turn imparts rotational motion to central inner gear 66. Since the outer part 62 of bearing-like member 60 is held rigidly onto holder 30, the rotational movement is transferred back to inner part 64 of bearing-like member 60, thereby rotating frame 20.

Figure 10:
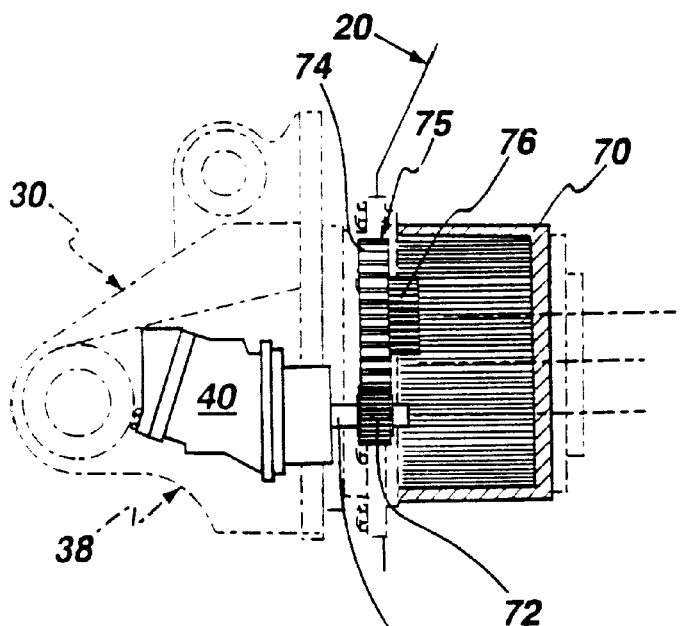
FIG. 10 is a side elevational view of a motor and transmission arrangement wherein the motor is not located coaxially with the axis of rotation of the felling head.
Figure 11:
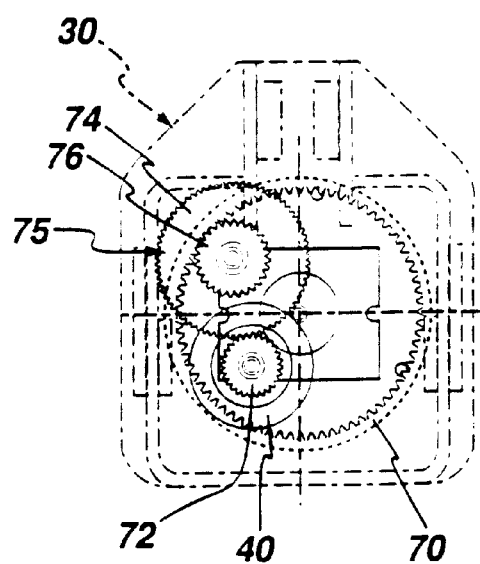
FIG. 11 is a front elevational view of the motor and transmission arrangement of FIG. 10.

FIGS. 10 and 11 illustrate a third embodiment of the present invention in which the axis of rotation of drive shaft 45 is not coaxial with the axis of rotation of frame 20. In this third embodiment, a transmission is thus provided to connect the offset drive shaft 45 to frame 20. In the variant illustrated in FIGS. 10 and 11, the transmission comprises a plurality of gears. In this particular variant, motor 40 is housed in the cavity of holder 30 but drive shaft 45 of motor 40 is not coaxial with the axis of rotation of frame 20. A small gear 72 is attached to drive shaft 45. This small gear 72 is coupled to intermediate gear 75 through the lower case gear 74. The upper case gear 76 of intermediate gear 75 is coupled to large gear 70 which is affixed to frame 20 and imparts the rotational motion to frame 20. In this arrangement, the torque of the motor 40 is transferred to drive shaft 45 which transfers it to lower case gear 74 of the intermediate gear 75 via the small gear 72. The torque is then transmitted to large gear 70 via the upper case gear 76 of the intermediate gear 75.

In other variants of the third embodiment, the transmission comprises a chain and sprocket. In a third variant, the transmission comprises a belt-drive mechanism.

The above description of preferred embodiments should not be interpreted in a limiting manner since other variations, modifications and refinements are possible within the spirit and scope of the present invention. The scope of the invention is defined in the appended claims and their equivalents.

I claim:

1. A felling head for mounting to the manipulator arm of a tree-cutting carrier used to restrain, cut, and manipulate trees, said felling head comprising:
    a frame;
    a holder connecting said frame to said manipulator arm;
    bearing-like member rotatably connecting said frame to said holder, said bearing-like member defining a rotational axis about which said frame may rotate;
    a motor having a drive shaft rotatable about said rotational axis, said drive shaft being coupled to said bearing-like member, whereby, in operation, said motor is adapted to impart rotational motion to said frame; and
    a gear assembly connecting said drive shaft to said frame, said gear assembly being adapted to cooperate with said drive shaft to impart rotational motion to said frame.

2. A felling head as defined in claim 1 wherein said motor is mounted to said holder.

3. A felling head as defined in claim 2 wherein said holder defines a cavity in which said motor is at least partially housed, said drive shaft protruding from said cavity.

4. A felling head as defined in claim 3 wherein said frame defines a cavity in which said gear assembly is at least partially housed.

5. A felling head as defined in claim 1 wherein said motor is mounted to said frame.

6. A felling head as defined in claims 5 wherein said frame defines a cavity in which said motor is at least partially housed, said drive shaft protruding from said cavity.

7. A felling head as defined in either claim 5 wherein said holder defines a cavity in which said gear assembly is at least partially housed.

8. A felling head as defined in claim 1 wherein said gear assembly is a planetary gear train.

9. A felling head for mounting to a suitable tree cutting carrier's manipulator arm for restraining trees, having a saw located in the bottom portion of said felling head, said felling head comprising:
    a frame
    a holder for connecting said frame to said manipulator arm, said holder defining a cavity;
    a gear assembly rotatably connecting said frame to said holder, said gear assembly defining a rotational axis about which said frame may rotate;
    a hydraulic motor at least partially housed in said cavity and having a drive shaft rotatable about said rotational axis, said drive shaft being coupled to said gear assembly, whereby in operation said motor is adapted to impart rotational motion to said frame.

10. A felling head for mounting to a suitable tree cutting carrier's manipulator arm for restraining, cutting and manipulating trees, said felling head comprising:
    a frame,
    a holder for connecting said frame to said manipulator arm;
    a transmission and bearing-like member assembly rotatably connecting said frame to said holder, said bearing-like member defining a rotational axis about which said frame may rotate;
    a motor mounted to said holder, said motor having a drive shaft, said drive shaft being coupled to said transmission, whereby, in operation, said motor is adapted to impart rotational motion to said frame.

11. A felling head as defined in claim 10 wherein said holder defines a cavity in which said motor is at least partially housed, said drive shaft protruding from said cavity.

12. A felling head as defined in claim 11 wherein said frame defines a cavity in which said gear assembly is at least partially housed.

13. A felling head as defined in claim 12 wherein said motor is radially spaced apart from the axis of rotation defined by the bearing-like member.

14. A felling head as defined in claim 12 wherein said motor is coaxial with said rotational axis defined by said bearing-like member.

15. A felling head as defined in claim 10 wherein said transmission comprises a belt.

16. A felling head as defined in claim 10 wherein said transmission comprises a gear assembly.

17. A felling head as defined in claim 10 wherein said transmission comprises a chain and sprocket.

18. A felling head as defined in claim 10 wherein said transmission comprises a rack and pinion.

19. A felling head for mounting to the manipulator arm of a tree-cutting carrier used to restrain, cut, and manipulate trees, said felling head comprising:
    a frame;
    a holder connecting said frame to said manipulator arm;
    a bearing-like member rotatably connecting said frame to said holder, said bearing-like member defining a rotational axis about which said frame may rotate; and
    a motor having a drive shaft, said drive shaft being coaxial with said rotational axis and rotatable about said rotational axis, said drive shaft being coupled to said bearing-like member, whereby, in operation, said motor is adapted to impart rotational motion to said frame.

20. The felling head as defined in claim 19 further comprising a gear assembly connecting said drive shaft to said frame, said gear assembly being adapted to cooperate with said drive shaft to impart rotational motion to said frame.

21. The felling head as defined in claim 20 wherein said motor is mounted to said holder.

22. The felling head as defined in claim 21 wherein said holder defines a cavity in which said motor is at least partially housed, said drive shaft protruding from said cavity.

23. The felling head as defined in claim 22 wherein said frame defines a cavity in which said gear assembly is at least partially housed.

24. The felling head as defined in claim 20 wherein said motor is mounted to said frame.

25. The felling head as defined in claim 24 wherein said frame defines a cavity in which said motor is at least partially housed, said drive shaft protruding from said cavity.

26. The felling head as defined in claim 25 wherein said holder defines a cavity in which said gear assembly is at least partially housed.

27. The felling head as defined in claim 20 wherein said motor is hydraulic.

28. The felling head as defined in claim 20 wherein said gear assembly is a planetary gear assembly.

* * * * *